United States Patent
Lewis et al.

(10) Patent No.: US 6,334,102 B1
(45) Date of Patent: Dec. 25, 2001

(54) METHOD OF ADDING VOCABULARY TO A SPEECH RECOGNITION SYSTEM

(75) Inventors: James R. Lewis, Delray Beach, FL (US); Kerry A. Ortega, Raleigh, NC (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/394,730

(22) Filed: Sep. 13, 1999

(51) Int. Cl.[7] .................................................... G10L 15/18
(52) U.S. Cl. ......................................... 704/255; 704/257
(58) Field of Search ................................... 704/243, 251, 704/256, 255, 257, 252, 247, 244, 270, 272, 277, 278

(56) References Cited

U.S. PATENT DOCUMENTS

| | | | |
|---|---|---|---|
| 4,783,803 | * 11/1988 | Baker et al. | 381/42 |
| 5,027,406 | * 6/1991 | Roberts et al. | 381/43 |
| 5,465,317 | * 11/1995 | Epstein | 704/236 |
| 5,613,036 | * 3/1997 | Strong | 704/243 |
| 5,680,511 | * 10/1997 | Baker et al. | 704/257 |
| 5,787,395 | * 7/1998 | Minamino | 704/255 |
| 5,852,801 | * 12/1998 | Hon et al. | 704/244 |
| 5,920,837 | * 7/1999 | Gould et al. | 704/251 |
| 5,970,460 | * 10/1999 | Bunce et al. | 704/278 |
| 6,195,634 | * 2/2001 | Dudemaine et al. | 704/231 |

OTHER PUBLICATIONS

IBM Tchnical Disclosure Bulletin. Method of adding new word models to a pre–existing set. pp. 434–435. May 1992.*

* cited by examiner

*Primary Examiner*—Richemond Dorvil
(74) *Attorney, Agent, or Firm*—Akerman Senterfitt (57) ABSTRACT

A method and a system for use in a computer speech recognition system for adding new vocabulary by using language model statistics corresponding to an existing vocabulary word. The method involves a series of steps including receiving a user input identifying a first word for which no language model statistics exist in the speech recognition system. The first word is for inclusion within the existing vocabulary of the speech recognition system. In response to a second user input identifying a second word for which language model statistics exist in the speech recognition system, recalling from a computer memory the language model statistics for the second word. The speech recognition system then automatically creates language model statistics for the first word by duplicating the language model statistics of the second word and replacing each occurrence of the second word in the duplicated language model statistics with the first word.

21 Claims, 7 Drawing Sheets

| Heathrow In England | Y | *A* |

| LaGuardia In England | Y | *B* |

| LaGuardia In England | Y x 2 | *C* |

| LaGuardia In New York | Y x 2 | *D* |

*FIG. 5*

First Word: LaGuardia

Frequency In Relation To
Second Word: Heathrow

○ Higher

○ Same

○ Lower

| OK | CANCEL |

*FIG. 6* fly to LaGuardia to LaGuardia in

LaGuardia in New York

*FIG. 7*

METHOD OF ADDING VOCABULARY TO A SPEECH RECOGNITION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software and more particularly to an improved method of adding vocabulary to a speech recognition system.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Improvements to speech dictation systems provide an important way to enhance user productivity.

Currently within the art, speech recognition systems possess a finite set of recognizable vocabulary words. These systems model and classify acoustic signals to form acoustic models, which are representations of basic linguistic units such as phonemes. From an acoustic analysis, speech recognition systems derive a list of potential word candidates for a given series of acoustic models. The potential word candidates are ordered from the most likely user intended word to the least likely. Next, the speech recognition system performs a contextual analysis between a language model, each potential word candidate, and the most recent words derived by the speech recognition system. The system may determine that although the first word candidate is the closest acoustic match to the user utterance, it does not fit the context of the text being dictated. The second word candidate, though not a perfect acoustic match to the user utterance, may more closely match the context of the text being dictated by the user. The system then makes a determination as to which word candidate is the correct user intended word.

The language model used within the speech recognition system is comprised of statistical models. Such statistical models, or language model statistics, are one, two, and three word groupings called unigrams, bigrams, and trigrams respectively, wherein each unigram, bigram, and trigram has an associated frequency. For example, trigrams can be formed by taking each word in a large corpus of text, called a training corpus, and constructing all possible three word permutations. The system can observe the frequency of each trigram that appears in the training corpus. This observed frequency is a measure of trigram probability. Trigrams that do not appear in the training corpus result in a trigram probability of zero. Unigrams, bigrams, and trigrams that do appear in the training corpus can be assigned corresponding frequency values.

In order for a user to add a word with no language model statistics to a speech recognition system, the user can analyze another training corpus to develop unigrams, bigrams, trigrams, and frequency data for the word. This situation occurs when a word has been left out of the training corpus. The user must develop the needed language model statistics for the word before adding it to the speech recognition system vocabulary. Alternatively, the user can edit each document that will contain the word by manually inserting the word in the document. Although this process can function relatively well when editing a small file or a small number of files, the process is cumbersome for persons that build specialized speech recognition vocabularies for different topics such as medical, legal, and travel. Such users deal with thousands of files. Moreover, the files can be too large for conventional editors.

The disadvantage is further compounded when the word to be added to the system behaves in the same or similar manner as another word recognizable to the system. In this case, developing language model statistics wastes time because the resulting information will differ only slightly from the language model statistics corresponding to the recognizable word. For example, if a user wants to add the word "Laguardia" to reference the airport located in New York, the user must develop language model statistics for "Laguardia". In this case, rather than developing completely new statistical information, the language model statistics for "Laguardia" can be based upon existing language model statistics for the word "Heathrow" in reference to the airport located in London.

Currently, a method of adding new words to speech recognition systems utilizing class files exists in the art. Class files allow the user to generate a file of words with similar properties. An example of a class file is a list of airport names. After the class file is created, the speech recognition system removes each word of the class file from the language model, replacing it with a reference to the class file. For example, if a class file called "airport" contained "O'Hare", "Heathrow", and "Laguardia", the system would remove all occurrences of those specific airport names contained in the class file "airport" from the language model. Each occurrence of a member of the class file would be replaced with the reference "[airport]". As a result, the trigram "Heathrow in England" would be changed to "[airport] in England".

Although words can be added to the speech recognition system vocabulary in this manner, class files neither incorporate frequency data, nor ensure contextual accuracy. Consequently, although the context of a trigram may clearly indicate an airport in England, the airport "Laguardia" located in New York is as likely a candidate as "Heathrow" to the speech recognition system. The lack of word frequency data and the lack of a method of ensuring contextual accuracy within class files can result in nonsensical trigrams such as "Laguardia in England". The user has no way of avoiding such a nonsensical outcome and no way to check for contextual accuracy. As a result, there has arisen a need for a more efficient way to add new vocabulary words to speech recognition systems.

SUMMARY OF THE INVENTION

The invention concerns a method and a system for adding new vocabulary by using language model statistics corresponding to an existing vocabulary word. The method of the invention involves a plurality of steps. First, the system receives a user input identifying a first word for which no language model statistics exist in the speech recognition system. The first word is for inclusion within the existing vocabulary of the speech recognition system. In response to a second user input identifying a second word for which language model statistics exist in the speech recognition system, the system recalls from a computer memory the language model statistics for the second word. Then the system automatically creates language model statistics for the first word by duplicating the language model statistics of the second word and replacing each occurrence of the second word in the duplicated language model statistics with the first word.

The speech recognition system receives a user input specifying a relative frequency of the first word in relation to the second word. Next the system automatically updates the language model statistics for the first word by modifying frequency values in the language model statistics for the first word according to the user specified relative frequency of the first word.

In one aspect of the invention, the system presents the user with at least one of a bigram and trigram from the language model statistics for the first word in a user readable format. Then the system receives user input specifying modifications to the bigrams and trigrams from the language model statistics for the first word, for inclusion in a language model of the speech recognition system.

Each of the user inputs received by the system can be in the form of a spoken utterance, and the first word and the second word can be related in meaning. Within the system, the language model statistics for the second word are comprised of each unigram, bigram, and trigram containing the second word and a frequency value for each unigram, bigram, and trigram. Additionally, the creating step involves duplicating each unigram, bigram, and trigram containing the second word and the frequency value of each unigram, bigram, and trigram. In further regard to the creating step, the system replaces each occurrence of the second word in each unigram, bigram, and trigram containing the second word with the first word.

Within the system, each unigram, bigram, and trigram containing the second word and a frequency value for each unigram, bigram, and trigram constitute the language model statistics for the second word. The updating step includes updating a frequency value of each unigram, bigram, and trigram containing the first word according to the user specified relative frequency of the first word.

According to a second aspect of the invention, the invention can be a computer speech recognition system for adding new vocabulary by using language model statistics corresponding to an existing vocabulary word. In that case, the system includes programming for receiving a user input identifying a first word for which no language model statistics exist in the speech recognition system. The first word is for inclusion within the existing vocabulary of the speech recognition system. In response to a second user input identifying a second word for which language model statistics exist in the speech recognition system, additional programming can be provided for recalling from a computer memory, language model statistics for the second word. The system preferably can include programming for automatically creating language model statistics for the first word by duplicating the language model statistics of the second word and replacing each occurrence of the second word in the duplicated language model statistics with the first word.

The system can include further programming for receiving a user input specifying a relative frequency of the first word in relation to the second word. Additionally, programming can be provided for automatically updating the language model statistics for the first word by modifying frequency values in the language model statistics for the first word according to the user specified relative frequency of the first word.

Programming can be provided for presenting the user with at least one of a bigram and trigram from the language model statistics for the first word in a user readable format. Additional programming can be included for receiving user input specifying modifications to the bigrams and trigrams from the language model statistics for the first word, for inclusion in a language model of the speech recognition system.

Programming can be provided to accommodate user input in the form of spoken utterances. Also, the first word and the second word can be related in meaning. The creating step can include programming for duplicating each unigram, bigram, and trigram containing the second word and a frequency value for each unigram, bigram, and trigram. In further regard to the creating step, programming can be provided for replacing each occurrence of the second word in each unigram, bigram, and trigram containing the second word with the first word.

Similar to the previously described method, each unigram, bigram, and trigram containing the second word and a frequency value for each unigram, bigram, and trigram constitute the language model statistics for the second word. Additionally, the updating step can include programming for updating a frequency value of each unigram, bigram, and trigram containing the first word according to the user specified relative frequency of the first word.

According to a third aspect, the invention may comprise a machine readable storage, having stored thereon a computer program having a plurality of code sections executable by a machine for causing the machine to perform a series of steps. These steps can include receiving a user input identifying a first word for which no language model statistics exist in the speech recognition system. The first word is for inclusion within the existing vocabulary of the speech recognition system. In response to a second user input identifying a second word for which language model statistics exist in the speech recognition system, the machine readable storage can cause the machine to perform the additional step of recalling from a computer memory the language model statistics for the second word. Preferably, the machine readable storage can cause the machine to perform the further step of automatically creating language model statistics for the first word by duplicating the language model statistics of the second word and replacing each occurrence of the second word in the duplicated language model statistics with the first word.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

Figure 1:
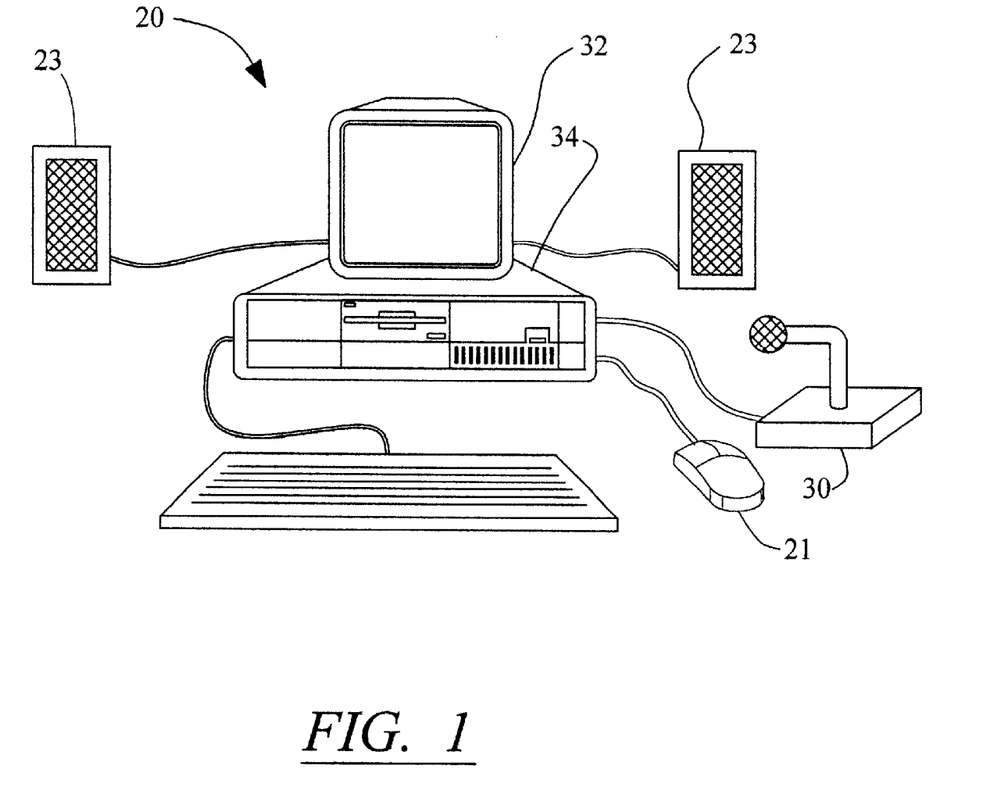
FIG. 1 is a block diagram which illustrates a computer system for speech recognition.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to said computer system through suitable interface circuitry or "sound board" (not shown), and at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation.

Figure 2:
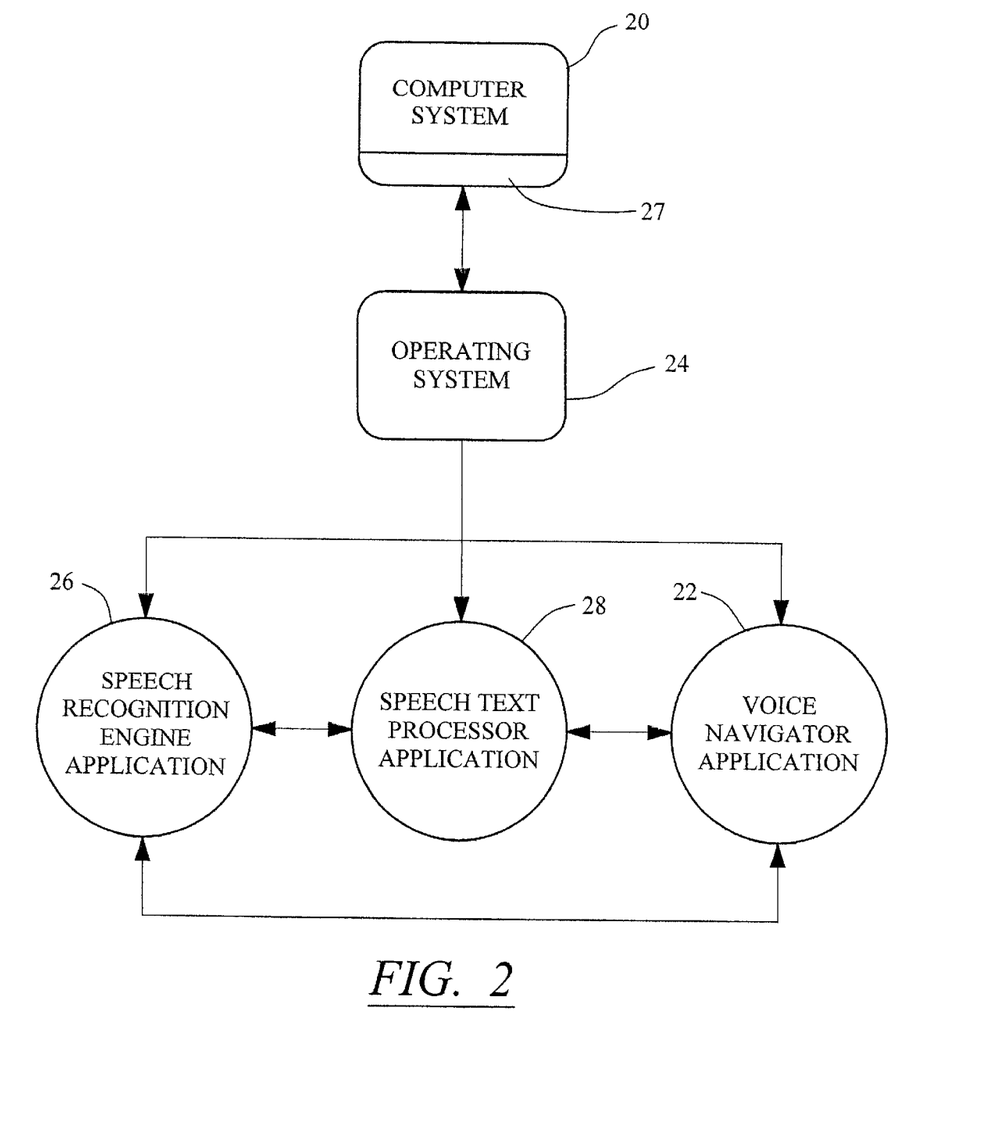
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. In the example shown, a speech text processor application 28 and a voice navigator application 22 are also provided. However the invention is not limited in this regard and the speech recognition engine application 26 can be used with any other application program which is to be voice enabled. In FIG. 2, the speech recognition engine 26, speech text processor 28 and the voice navigator 22 are shown as separate application programs. It should be noted however that the invention is not limited in this regard, and these various application programs could be implemented as a single, more complex applications program. For example the speech recognition application 26 could be combined with the speech text processor application or with any other application to be used in conjunction with the speech recognition application. Also, if no other speech controlled application programs are to be operated in conjunction with the speech text processor application and speech recognition engine, then the system can be modified to operate without the voice navigator application. The voice navigator primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a user into microphone 30.

Figure 3:
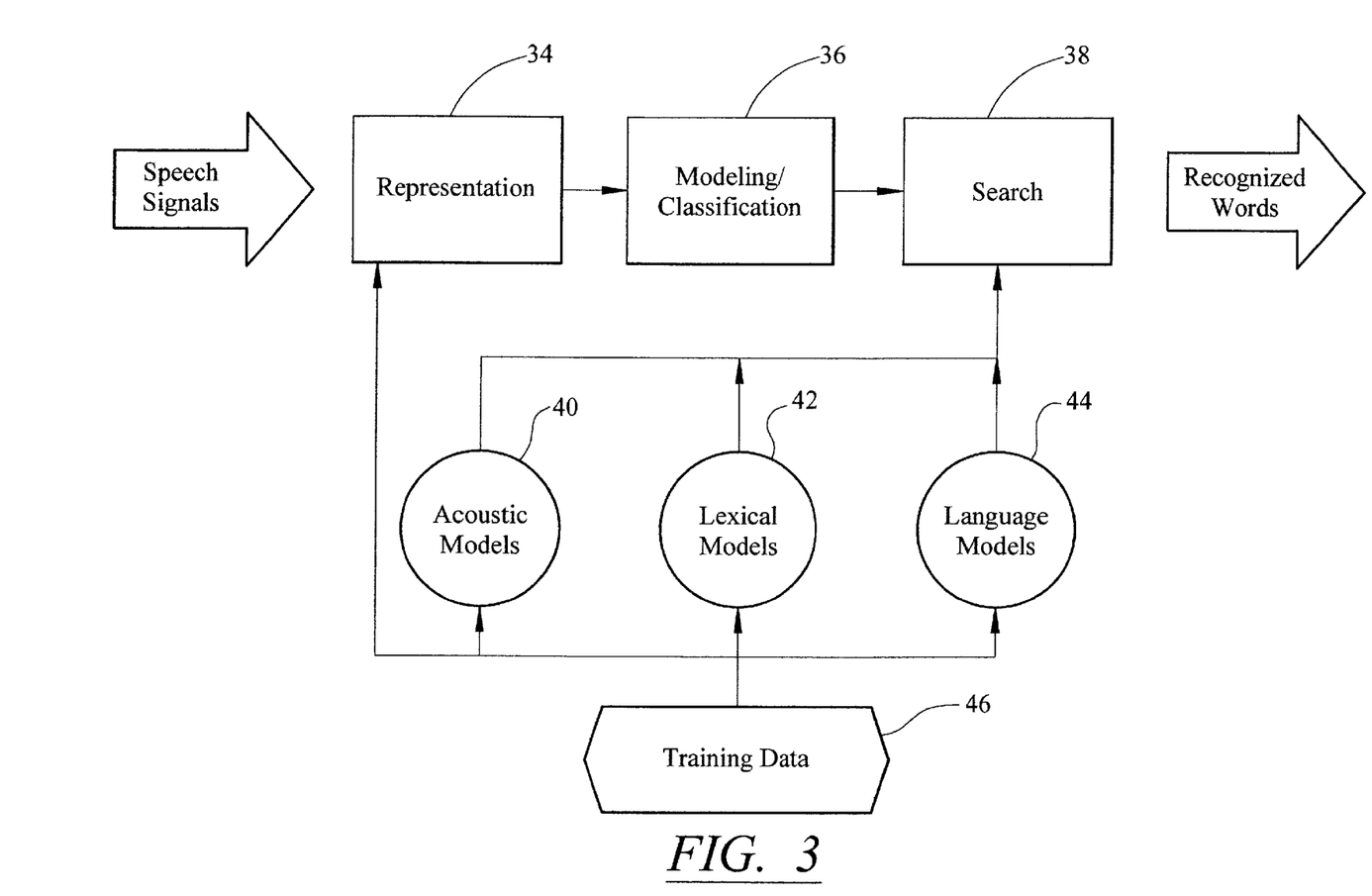
FIG. 3 is a block diagram showing a typical architecture for a speech recognition engine.

FIG. 3 is a block diagram showing typical components which comprise speech recognition application 26. As shown in FIG. 3 the speech recognition engine 26 receives a digitized speech signal from the operating system. The system is subsequently transformed in representation block 34 into a useful set of data by sampling the signal at some fixed rate, typically every 10–20 msec. The representation block produces a new representation of the audio signal which can then be used in subsequent stages of the voice recognition process to determine the probability that the portion of waveform just analyzed corresponds to a particular phonetic event. This process is intended to emphasize perceptually important speaker independent features of the speech signals received from the operating system. In modeling/classification block 36, algorithms process the speech signals further to adapt speaker-independent acoustic models to those of the current speaker. Finally, in search block 38, search algorithms are used to guide the search engine to the most likely words corresponding to the speech signal. The search process in search block 38 occurs with the help of acoustic models 40, lexical models 42, and language models 44.

Language models 44 are used to help restrict the number of possible words corresponding to a speech signal when a word is used together with other words in a sequence. The language model can be specified very simply as a finite state network, where the permissible words following each word are explicitly listed, or can be implemented in a more sophisticated manner making use of context sensitive grammar. In any case, it is often desirable to update the content of the language model with information concerning speech patterns likely to be encountered in the case of a specific user. According to the preferred embodiment of the invention, the language model is updated making note of user corrections of misrecognized words in dictated text and using this information to update the language model.

Figure 4A:
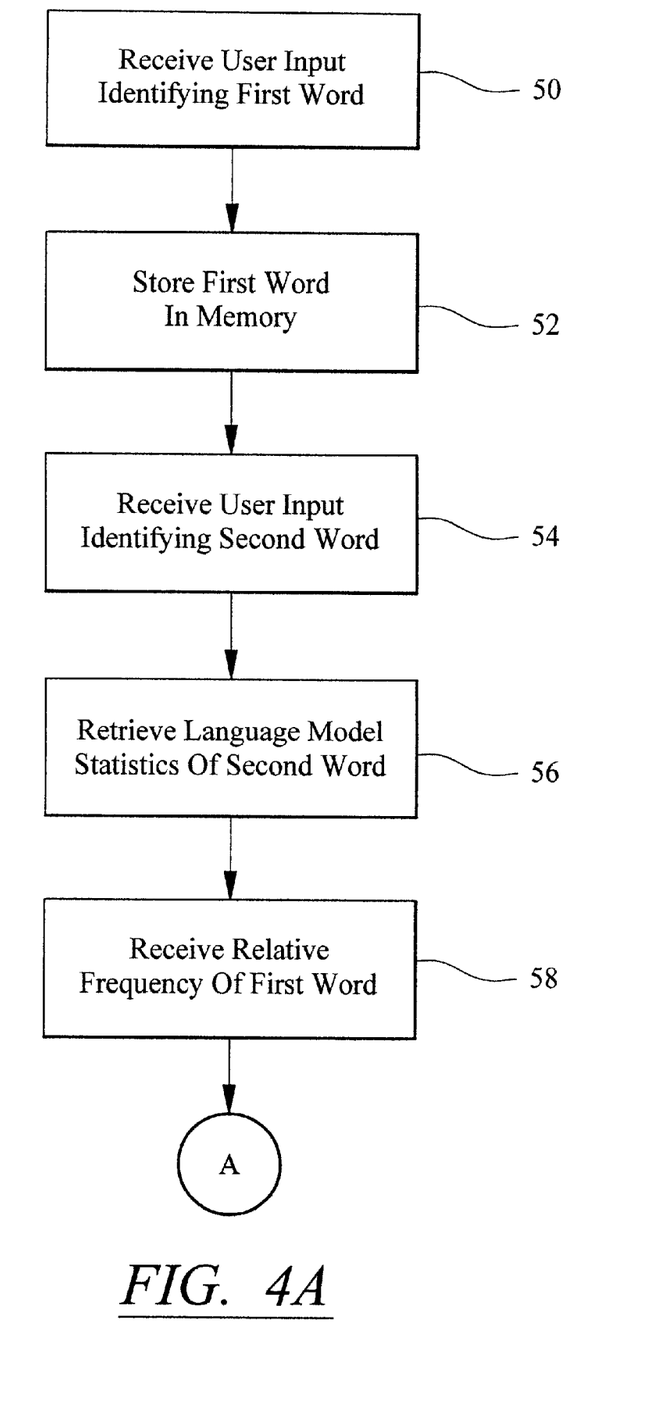
FIGS. 4A and 4B taken together are a flow chart illustrating a process for adding a word to a speech recognition system vocabulary by using the language model statistics of another word.
Figure 4B:
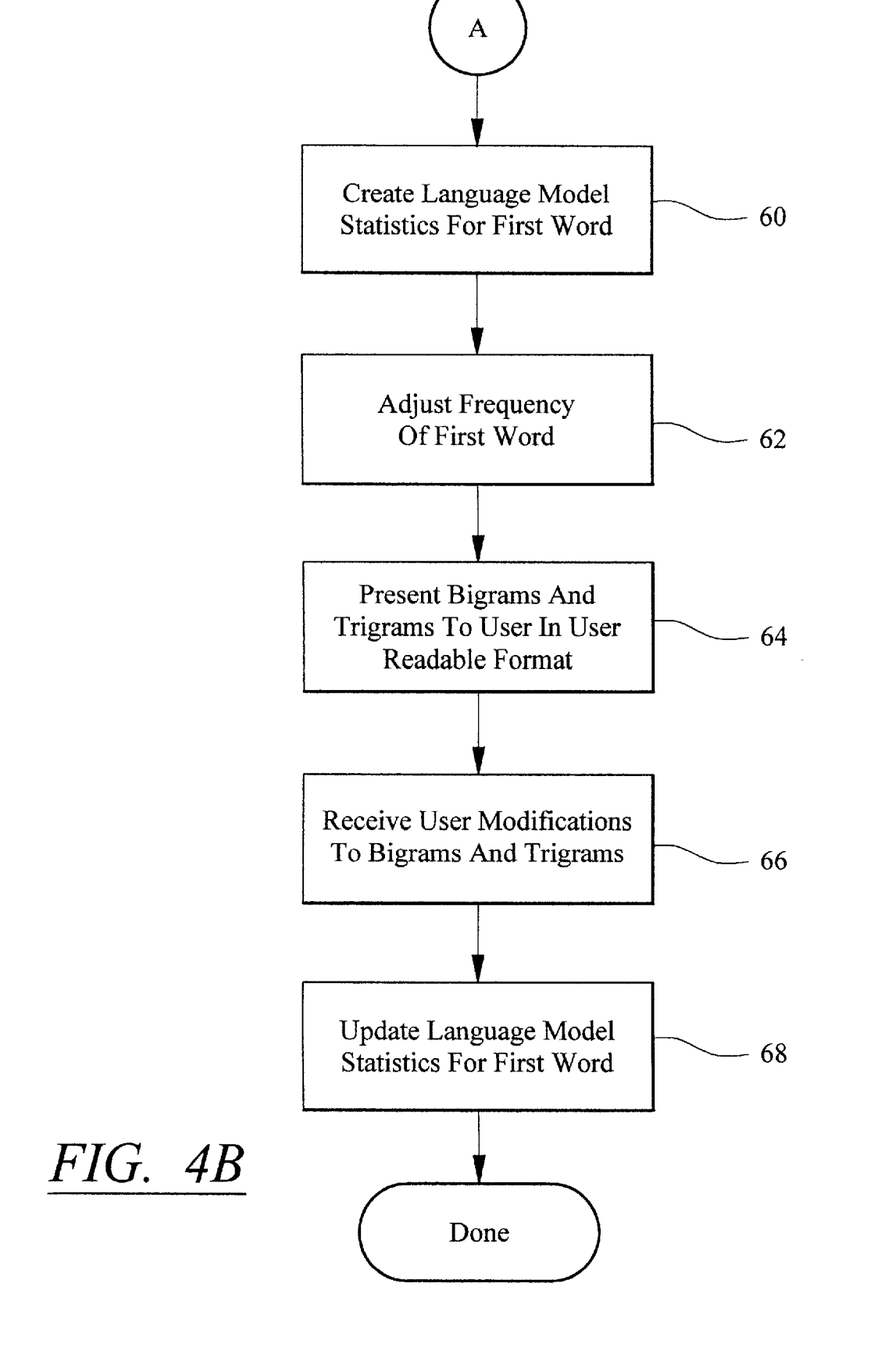

FIGS. 4A and 4B taken together are a flow chart illustrating a process for adding a word to a speech recognition system vocabulary by using the language model statistics of another word. According to a preferred embodiment, the user can select an option in the computer speech recognition system placing the system in an edit mode for receiving words for which no language model statistics exist in the speech recognition system.

In FIG. 4A in step 50, the system receives a user input identifying a first word for which no language model statistics exist in the speech recognition system. The user input can be in any suitable form including but not limited to the form of a spoken user utterance received by microphone 30, a user keyboard entry, or input from a pointing device such as a mouse 21. If the user input received at step 50 is in the form of a user spoken utterance, then the speech recognition engine application 26 converts the spoken utterance into text representing the first word for inclusion in the existing system vocabulary. In this case, using only acoustic analysis, the speech recognition engine application 26 converts the user spoken utterance into text without the aid of statistical models. Alternatively, if the system cannot derive the first word from an acoustic analysis of the user spoken utterance, then the user can articulate the spelling of the first word to the system letter by letter. From the user articulated spelling, the speech recognition engine application 26 can derive the text representing the first word for inclusion in the existing system vocabulary. If the user input received at step 50 is in the form of a user keyboard entry, then the first word is derived directly from the user's keystrokes.

In step 52, the system stores the first word at a defined memory location.

In step 54, the system receives a subsequent user input identifying a second word for which language model statistics exist in the system. The second word is input by the user and is related to, or similar in meaning to the first word. For example, in the case of the user building a vocabulary and adding the names of American stadiums to the speech recognition system, the first word can be "Pro Player", treated as one word in this case. Next the user determines a second word existing in the system with a similar meaning to the first word. In this case, the user would input the name of another stadium, such as "Giant", referring to "Giant Stadium". Alternatively, depending on the specialized vocabulary being built by the user, the user can use a thesaurus as a source of first and second words which are related in meaning. Regardless of how the user determines the second word, the subsequent user input can be in any suitable form including but not limited to the form of a spoken user utterance received by microphone 30, a user keyboard entry, or input from a pointing device such as a mouse 21. If the subsequent user input is a spoken utterance, then the speech recognition engine application converts the spoken utterance to text representing the second word. If the subsequent user input is a keyboard entry, then the system derives the second word directly from the user's keystrokes.

In step 56 the system retrieves the language model statistics corresponding to the second word from the language model of the speech recognition system. For example, the speech recognition system can retrieve all of the unigrams, bigrams, and trigrams containing the second word from computer memory. Additionally, the speech recognition system recalls the frequency value associated with each unigram, bigram, and trigram containing the second word.

In step 58, the system receives user input specifying a relative frequency of the first word in relation to the second word. It should be appreciated by those skilled in the art that step 58 is an optional step for obtaining improved results using the inventive method described herein. The subsequent user input can be in any suitable form, including but not limited to the form of a spoken user utterance received by microphone 30, a user keyboard entry, or input from a pointing device such as a mouse 21. In step 58, the system can prompt the user with questions to determine the frequency of the first word in relation to the second word. For example, in the case of the first word being "Laguardia" and the second word being "Heathrow", the system can ask the user if "Laguardia" is more or less commonly used by the user than "Heathrow". Alternatively, the user can be presented with a graphical user interface (GUI) which asks the user to specify a relative frequency of the first word in relation to the second word. In this case, if the first word "Laguardia" is used twice as often as the second word "Heathrow", then the user can enter a relative frequency of 2, 200%, 10/5 or any other suitable value indicating that the frequency of the first word is twice the frequency of the second word. Another alternative is for the user to specify a general frequency value. In this case, the user can specify that the frequency of the first word "Laguardia" is either higher, lower, or the same as the second word "Heathrow". It should be appreciated that the invention is not so limited by the manner in which the user specifies relative frequency data. The system can then store the relative frequency data entered by the user in a memory location associated with the first word already stored in memory.

From step 58, the system proceeds to jump circle A in FIG. 4A, and then continues to step 60 in FIG. 4B. In step 60, the speech recognition system automatically creates language model statistics for the first word. Language model statistics for the first word can be created by automatically duplicating the language model statistics of the second word at a memory location associated with the first word. Then the system automatically replaces each occurrence of the second word in the duplicated language model statistics with the first word. For example, the system duplicates each unigram, bigram, and trigram containing the second word and the frequency value associated with each unigram, bigram, and trigram. Then, the speech recognition system replaces each occurrence of the second word within each unigram, bigram, and trigram with the first word. After completion of step 60, language model statistics exist in the speech recognition system for the first word.

In step 62, the system updates the language model statistics of the first word by adjusting the frequency data in the language model statistics for the first word. The frequency data can be adjusted by the system by increasing or decreasing the frequency data by a percentage. Alternatively, the frequency data can be adjusted by adding or subtracting a numerical value from the frequency data. It should be appreciated that if the relative frequency of the first word in relation to the second word is the same, then the system does not update the frequency data. For example, each unigram, bigram, and trigram for the first word has a frequency value associated with it that still corresponds to the second word. The system retrieves the user specified relative frequency value of the first word from memory and adjusts the frequency of each unigram, bigram, and trigram containing the first word accordingly. For example, in the case where the user enters a relative frequency value such as 2, the speech recognition system can multiply the frequency value of each unigram, bigram, and trigram containing the first word by a factor of 2. It should be appreciated that the relative frequency value can be greater than, lesser than, or equal to 1. Alternatively, if the user specifies a general relative frequency as being higher, lower, or the same as the second word, the system can adjust the frequency value of each unigram, bigram, and trigram containing the first word by a predetermined percentage. This percentage can adjust the frequency value higher, lower, leave the frequency unchanged. Another alternative is for the system to add or subtract a predetermined value from frequency value. In this case the frequency value can be increased, decreased, or left unchanged. The predetermined value or predetermined percentage can be system determined or user specified. For example, if the user specifies a relative frequency of the first word "Laguardia" as being higher than the second word "Heathrow", then the system can add the predetermined value to the frequency value of each unigram, bigram, and trigram for "Laguardia". In the case of a frequency being expressed as an integer, the predetermined value of 5 can be added. In the case of a frequency being expressed as a decimal, the predetermined value of 0.2 can be added. In either case, the frequency of the first word "Laguardia" is increased because each relevant unigram, bigram, and trigram's frequency value is increased by the predetermined value.

Figure 7:
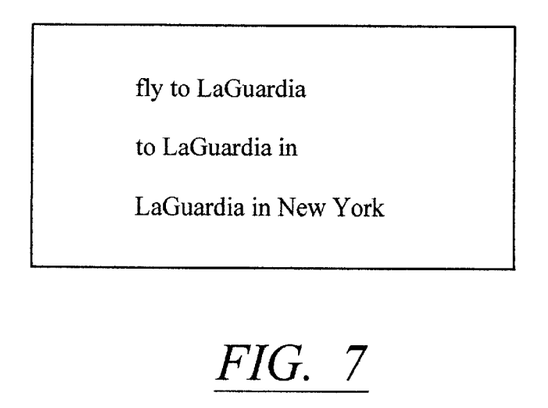
FIG. 7 depicts an exemplary graphical user interface for presenting the user with trigrams in a user readable format.

In step 64, the system can optionally present the user with the language model statistics for the first word in user readable format. It should be appreciated by those skilled in the art that steps 64 through 68 are optional steps for obtaining improved results using the inventive method described herein. Such an embodiment improves the contextual accuracy of the speech recognition system. For example, the system can present the user with bigrams and trigrams containing the first word. The bigrams and trigrams can be presented to the user in any of a variety of formats using various GUIs including but not limited to a list or table format. Thus, FIG. 7 depicts a graphical user interface for displaying trigrams to the user. By presenting the bigrams and trigrams to the user and allowing the user to modify or delete the bigrams and trigrams, the speech recognition system can ensure contextual accuracy. The user can detect nonsensical bigrams and trigrams.

In step 66 in FIG. 4B, the user can edit such nonsensical bigrams and trigrams for contextual accuracy, or alternatively the bigrams and trigrams can be deleted if the user so desires. The system receives the user edits to the bigrams and trigrams for incorporation into the language model statistics of the first word.

In step 68, the speech recognition system updates the language model of the speech recognition system by incorporating any user modifications to the language model statistics of the first word. For example, modifications to bigrams and trigrams from step 66 can be incorporated in the language model and any bigrams and trigrams that the user selects for deletion can be deleted from the language model.

Figure 5:
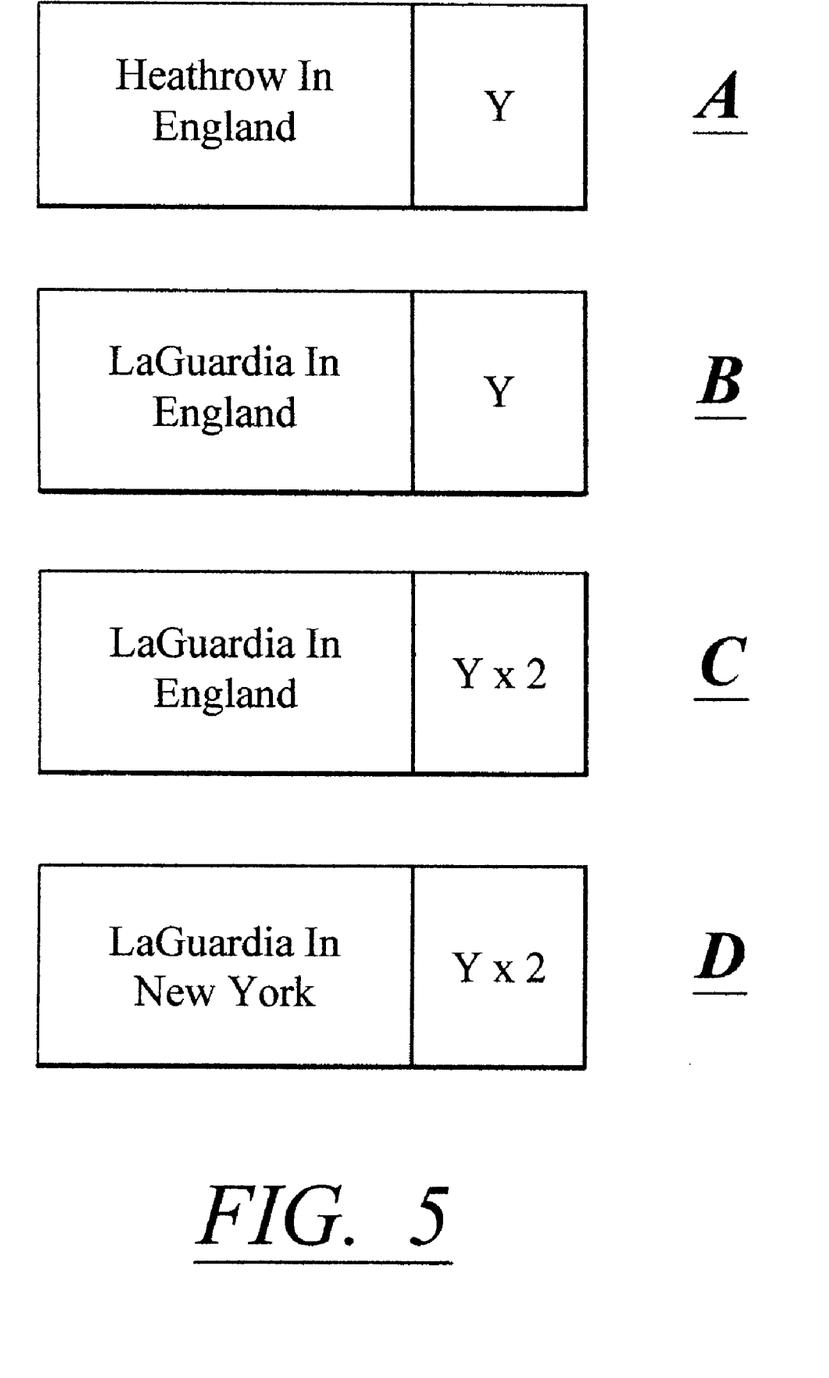
FIGS. 5A through 5D depict trigrams throughout various points of the inventive method described herein.

FIG. 5A depicts an exemplary trigram for the word "Heathrow" whereby the frequency data associated with the word Heathrow is denoted by the variable Y. Such a trigram would be among the language model statistics retrieved from memory in step 56 of the inventive method if the user specifies the word "Heathrow" as the second word.

FIG. 5B depicts the exemplary trigram of FIG. 5A after completion of step 60 of the inventive method where the speech recognition system duplicates the unigrams, bigrams, trigrams, and associated frequency data of the second word and replaces each occurrence of the second word "Heathrow" with the first word "Laguardia". Thus, the trigram is changed from "Heathrow in England" to "Laguardia in England".

FIG. 5C depicts the exemplary trigram of FIG. 5B after completion of step 62 of the inventive method. The trigram is now part of the language model statistics of the first word "Laguardia". Additionally, the speech recognition system adjusts the frequency of each unigram, bigram, and trigram containing the first word "Laguardia" according to the user specified relative frequency value specified in step 58. Because the user specified frequency of the first word "Laguardia" in relation to "Heathrow" was 2, the frequency of the trigram "Laguardia in England" is now 2Y, twice its original value of Y.

FIG. 5D depicts the exemplary trigram of FIG. 5C after completion of step 66 of the inventive method wherein the user has edited the trigram so that the trigram is contextually accurate. For example, because "Laguardia" is located in New York, not in England, the user has edited the trigram to read "Laguardia in New York". Notably, the system treats "New York" as being one word in this instance. In this case, the system can present the bigrams and trigrams of the first word to the user in a user readable format. The system can then receive a user input identifying the word "England" within the trigram. The user input can be in any suitable form including but not limited to the form of a spoken user utterance received by microphone 30, a user keyboard entry, or input from a pointing device such as a mouse 21. After selecting the word "England", the system can receive a subsequent user input identifying a replacement word for "England". In this case the subsequent user input identifies the replacement word "New York". Thus, the exemplary trigram depicted in FIG. 5D is now contextually accurate.

Figure 6:
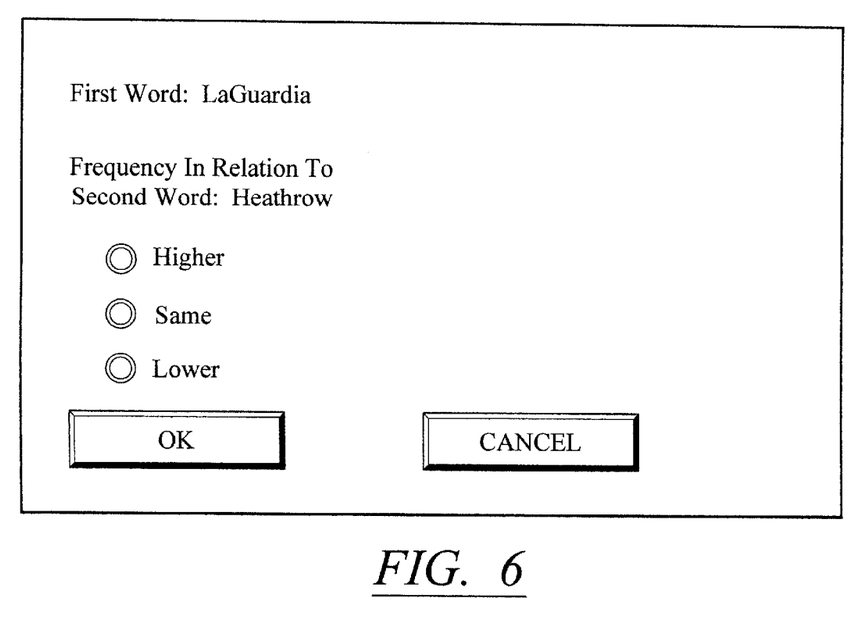
FIG. 6 depicts an exemplary graphical user interface offering the user preset selections for modifying the frequency of a word.

FIG. 6 depicts an exemplary GUI for use in step 58 of the inventive method, wherein the user can specify a general relative frequency of the first word "Laguardia" in relation to the second word "Heathrow". Thus, the user can select one of the three user activatable buttons on a user interface to specify that the frequency of "Laguardia" is either higher, the same, or lower than the frequency of "Heathrow".

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer speech recognition system, a method for adding new vocabulary by using language model statistics corresponding to an existing vocabulary word, comprising the steps of:

receiving a first user input identifying a first word for which no language model statistics exist in said speech recognition system, said first word for inclusion within the existing vocabulary of said speech recognition system;

in response to a second user input identifying a second word for which language model statistics exist in said speech recognition system, recalling from a computer memory said language model statistics for said second word; and,     automatically creating language model statistics for said first word by duplicating said language model statistics of said second word and replacing each occurrence of said second word in said duplicated language model statistics with said first word.

2. The method according to claim 1, further comprising the step of:

receiving a user input specifying a relative frequency of said first word in relation to said second word.

3. The method according to claim 2, further comprising the step of:

automatically updating said language model statistics for said first word by modifying frequency values in said language model statistics for said first word according to said user specified relative frequency of said first word.

4. The method according to claim 3 further comprising the steps of:

presenting said user with at least one of a bigram and trigram from said language model statistics for said first word in a user readable format; and,     receiving user input specifying modifications to said bigrams and trigrams from said language model statistics for said first word, for inclusion in a language model of said speech recognition system.

5. The method according to claim 4, wherein each of said user inputs is a spoken utterance.

6. The method according to claim 3, wherein said updating step comprises updating a frequency value of each unigram, bigram, and trigram containing said first word according to said user specified relative frequency of said first word.

7. The method according to claim 1, wherein each of said user inputs is a spoken utterance.

8. The method according to claim 1, wherein said first word and said second word are related in meaning.

9. The method according to claim 1 wherein said language model statistics for said second word are comprised of each unigram, bigram, and trigram containing said second word and a frequency value for each said unigram, bigram, and trigram.

10. The method according to claim 1, wherein said creating step comprises:

duplicating each unigram, bigram, and trigram containing said second word and a frequency value for each said unigram, bigram, and trigram; and, replacing each occurrence of said second word in each said unigram, bigram, and trigram containing said second word with said first word.

11. In a computer speech recognition system, a system for adding new vocabulary by using language model statistics corresponding to an existing vocabulary word, comprising:

means for receiving a first user input identifying a first word for which no language model statistics exist in said speech recognition system, said first word for inclusion within the existing vocabulary of said speech recognition system;

means for recalling from a computer memory, language model statistics for a second word in response to a second user input identifying said second word for which said language model statistics exist in said speech recognition system; and, means for automatically creating language model statistics for said first word by duplicating said language model statistics of said second word and replacing each occurrence of said second word in said duplicated language model statistics with said first word.

12. The system according to claim 11, further comprising:

means for receiving a user input specifying a relative frequency of said first word in relation to said second word.

13. The system according to claim 12, further comprising:

means for automatically updating said language model statistics for said first word by modifying frequency values in said language model statistics for said first word according to said user specified relative frequency of said first word.

14. The system according to claim 13, further comprising:

means for presenting said user with at least one of a bigram and trigram from said language model statistics for said first word in a user readable format; and, means for receiving user input specifying modifications to said bigrams and trigrams from said language model statistics for said first word, for inclusion in a language model of said speech recognition system.

15. The system according to claim 14, wherein each of said user inputs is a spoken utterance.

16. The system according to claim 13, wherein said updating means further comprises means for updating a frequency value of each unigram, bigram, and trigram containing said first word according to said user specified relative frequency of said first word.

17. The system according to claim 11, wherein each of said user inputs is a spoken utterance.

18. The system according to claim 11, wherein said first word and said second word are related in meaning.

19. The system according to claim 11, wherein said language model statistics for said second word are comprised of each unigram, bigram, and trigram containing said second word and a frequency value for each said unigram, bigram, and trigram.

20. The system according to claim 11, wherein said means for automatically creating language model statistics further comprises:

means for duplicating each unigram, bigram, and trigram containing said second word and a frequency value for each said unigram, bigram, and trigram; and, means for replacing each occurrence of said second word in each said unigram, bigram, and trigram containing said second word with said first word.

21. A machine readable stored thereon a computer program having a plurality of code sections executable by a machine for causing the machine to perform the steps of:

receiving a first user input identifying a first word for which no language model statistics exist in said speech recognition system, said first word for inclusion within the existing vocabulary of said speech recognition system;

in response to a second user input identifying a second word for which language model statistics exist in said speech recognition system, recalling from a computer memory said language model statistics for said second word; and, automatically creating language model statistics for said first word by duplicating said language model statistics of said second word and replacing each occurrence of said second word in said duplicated language model statistics with said first word.

* * * * *